(12) United States Patent
Christensen

(10) Patent No.: US 10,532,898 B2
(45) Date of Patent: Jan. 14, 2020

(54) DENESTING ELEMENT FOR CLOSELY STACKED OBJECTS

(71) Applicant: JYSK KONSTRUKTIONSTEKNIK A/S, Randers SV (DK)

(72) Inventor: Flemming Aarslev Christensen, Randers SV (DK)

(73) Assignee: JYSK KONSTRUKTIONSTEKNIK A/S, Randers SV (DE)

( * ) Notice: Subject to any disclaimer, the term of this patent is extended or adjusted under 35 U.S.C. 154(b) by 0 days.

(21) Appl. No.: 15/568,775

(22) PCT Filed: Apr. 22, 2016

(86) PCT No.: PCT/DK2016/000018
§ 371 (c)(1),
(2) Date: Oct. 23, 2017

(87) PCT Pub. No.: WO2016/169566
PCT Pub. Date: Oct. 27, 2016

(65) Prior Publication Data
US 2018/0086574 A1  Mar. 29, 2018

(30) Foreign Application Priority Data

Apr. 23, 2015 (DK) .................................. 2015 00251

(51) Int. Cl.
*B65G 59/10* (2006.01)

(52) U.S. Cl.
CPC .... *B65G 59/102* (2013.01); *B65G 2201/0258* (2013.01)

(58) Field of Classification Search
CPC ...................... B65G 59/102; B65G 2201/0258

USPC .................... 414/795, 4, 795.6, 797.4, 797.7
See application file for complete search history.

(56) References Cited

U.S. PATENT DOCUMENTS

| 1,621,098 A | * | 3/1927 | Anderson | B65G 59/102 |
| | | | | 221/297 |
| 1,907,713 A | * | 5/1933 | Benson | B65G 59/102 |
| | | | | 221/223 |
| 4,169,541 A | * | 10/1979 | Ragard | H05K 13/02 |
| | | | | 221/281 |

(Continued)

FOREIGN PATENT DOCUMENTS

| FR | 2449625 A1 | 9/1980 |
| FR | 2561634 A1 | 9/1985 |
| GB | 935833 A | 9/1963 |

OTHER PUBLICATIONS

PCT: International Search Report and Written Opinion of PCT/DK2016/000018 (related application); dated Sep. 8, 2016; 10 pgs.

*Primary Examiner* — Lynn E Schwenning

(57) ABSTRACT

This disclosure relates to a denesting element for a denesting apparatus for denesting a stack of objects in a predetermined denesting direction, comprising a base and a contact section, wherein the base is disposed between the contact section and a drive element of the denesting apparatus, wherein the drive element drives the base rotationally or translationally, and wherein the contact section, when the denesting element is mounted in the denesting apparatus, is capable of being biased towards and away from a stack of trays by being elastically displaceable between an extended position and a retracted position.

9 Claims, 4 Drawing Sheets

(56) References Cited

U.S. PATENT DOCUMENTS

| | | |
|---|---|---|
| 4,300,704 A | 11/1981 | Funke et al. |
| 4,441,630 A | 4/1984 | Sauer |
| 4,909,412 A * | 3/1990 | Cerf .................... B65G 59/105 |
| | | 221/1 |
| 2002/0131855 A1* | 9/2002 | Sonderby Kristensen .................. |
| | | B65B 43/44 |
| | | 414/795.6 |
| 2007/0278240 A1* | 12/2007 | Dideriksen .......... B65G 59/105 |
| | | 221/1 |

* cited by examiner

DENESTING ELEMENT FOR CLOSELY STACKED OBJECTS

CROSS-REFERENCE TO RELATED APPLICATIONS

This application is a U.S. National Phase application submitted under 35 U.S.C. § 371 of Patent Cooperation Treaty application serial no. PCT/DK2016/000018, filed Apr. 22, 2016, and entitled DENESTING ELEMENT FOR CLOSELY STACKED OBJECTS, which application claims priority to Denmark patent application serial no. PA 2015 00251, filed Apr. 23, 2015, and entitled DENESTING ELEMENT FOR CLOSELY STACKED OBJECTS.

Patent Cooperation Treaty application serial no. PCT/DK2016/000018, published as WO 2016/169566 A1, and Denmark patent application serial no. PA 2015 00251, are incorporated herein by reference.

TECHNICAL FIELD

This disclosure relates to denesting of closely stacked objects in a predetermined denesting direction from a denesting apparatus.

BACKGROUND

Many types of products such as ice cream, meat products and prefabricated meals are packed in objects, which have a cavity with an edge. The objects may be trays, bowls or cups. The objects are shaped for packing, transporting and storing in space-saving nested stacks to the site, where the products to be contained are filled into the objects.

The stack of objects is also convenient for loading the objects into a denesting apparatus. The denesting apparatus may be positioned over a conveyor belt, which transports the objects from the nested stack, after having been denested from the stack, to a conveyor and a filling station where the food product or other product is filled into the cavity of the objects. The filled object may subsequently be sealed by application of a lid or other sealing device, and further processed as needed, e.g., heat treated, labelled etc.

To achieve high speed filling and subsequent processing, the objects must be denested reliably and at a high rate of speed from the nested stack in the denesting apparatus.

Satisfactory denesting, however, is difficult to obtain, among others because the objects may be stacked very closely due to the shape of the objects and/or due to the material, which the objects are made of. Shapes of the objects may be rectangular, triangular or other polygonal shape, with more or less rounded corners, or round, oval, or any shape along a circumference of the objects. Materials of the objects may especially be plastic such as polypropylene, PET, APET, CPET, HICEPET, OPS, or metal such as aluminium, or fibrous products such as cardboard, paper and wooden veneer, or any other material, which may be manufactured and used in a configuration of thin sheets, either flat or three-dimensional.

Rapid and precise timing of denesting of an object from a nested stack is difficult to obtain because of frictional forces and vacuum forces holding the object to the stack. Failure of denesting the object from the nested stack of objects on time in a rapid and precise manner may result in intermediate stop of subsequent processing lines.

A denesting apparatus, which provides rapid and precise denesting of objects, is difficult to construct, because the apparatus must support the stack of objects while at the same time releasing an object of the stack. To achieve denesting more rapidly and at a greater precision of only the intended number of objects at a time, conventional denesting apparatuses have utilised various mechanisms for denesting of the objects.

WO 2005/044703, which is hereby incorporated by reference, discloses an apparatus for denesting of stacked objects in a predetermined denesting direction. The denesting apparatus has at least one denesting element for repetitive denesting of at least one object at a time. The denesting element has a first supporting member and a second supporting member for supporting a first object and a second object, respectively, of the stacked objects. The first object is an outermost object and intended for immediate subsequent release in the predetermined denesting direction. The second object is an object neighbouring the first object and situated between the first object and the remaining stack of objects. The denesting element rotates in an initial rotational direction being determined by the at least one initial first object being released from the support of the first supporting member and from the stack of objects, while at the same time an initial second object is still supported by the second supporting member.

GB 935,833 also discloses a dispenser for receptacles. A plurality of finger supporting levers oscillate adjacent the opening through which the receptacles are dropped. The levers extends toward the edge of the opening, and each lever having a pair of vertically and laterally spaced fingers alternately engaging and supporting rims of the receptacles. The vertical spacing of the fingers is substantially equal to the vertical thickness of the rims. One of the fingers is vertically yieldable to compensate for the usual production tolerance variations in the thickness of the rims of the receptacles. The dispenser is not suited for closely stacked receptacles. The dispenser only compensates for the thickness of the rims of the receptacles. The dispenser cannot compensate for a possibly varying distance between the rims of the receptacles.

SUMMARY

It is a purpose of the present disclosure to enable denesting of objects from a stack of objects, where the stack of objects contains closely stacked objects. It is also a purpose of the present disclosure to enable denesting of objects from a stack of objects, where said stack of objects contains objects stacked with varying extensions of gaps formed by edges of the objects, seen along a longitudinal extension of the stack.

By closely stacked objects are meant objects, where an extension of a gap formed by edges of the objects of the stack, seen along an extension of the stack, is less than 5 20 mm, possibly less than 2 mm, or even less than 1 mm.

The purposes of the disclosure are obtained by a denesting element, where the denesting element has at least a base and a contact section, where the base is intended for being placed between the contact section and a drive element of the denesting apparatus, where the drive element is intended for driving the base rotationally or translationally, and where the contact section, when the base is placed between the contact section and the drive element of the denesting apparatus, and when the denesting element is mounted in the denesting apparatus, is capable of being biased towards and away from the stack of trays by being displaced elastically between an extended position and a retracted position of the contact section.

The extended position of the contact section is a position more towards the stacked objects than the retracted position of the contact section, and the retracted position of the contact section is a position less towards the stacked objects than the extended position of the contact section. A contact section being elastically displaceable results in the contact section being flexible and adjustable to any tolerances within the gap and between the denesting element and the stack of objects. Tolerances may be tolerances in the extension of the gap formed by edges of the objects, and forming the gap, parallel to a denesting direction of the objects, and tolerances within the gap towards the edges of the objects.

An important aspect of the denesting element according to the disclosure is that the contact section is capable of being elastically displaced between the extended position and the retracted position, when the denesting element is mounted in the denesting apparatus. Elastic displacement of the contact section between the extended position and the retracted position, when the denesting element is mounted in the denesting apparatus, results in that the contact section stays in the gap during denesting of objects, and that the contact section always contacts the edge of an object during denesting of the object.

If the contact section is not able to displace elastically, as is the case in prior art denesting apparatuses, a risk occurs of the contact section slipping out of the gap and/or of the contact section not contacting the edge of object, resulting in no denesting.

If the contact section is not able to displace elastically, as is the case in prior art denesting apparatuses, slipping of the contact section may occur, if the stack of objects displaces within the denesting apparatus, possibly due to tolerances between edges of the objects and guide rails (see FIG. 4 and FIG. 5) of the denesting apparatus, and between which guide rails the stack of objects is placed. No contact of the contact section with the edge of an object may also occur, if the stack of objects displaces within the denesting apparatus.

If the contact section is not able to displace elastically, as is the case in prior art denesting apparatuses, slipping of the contact section may also occur, if an extension of a gap, which the contact section engages, and parallel to the dispensing direction, is limited. A limited extension of the gap may occur, if the extension of the gap, seen parallel to the dispensing direction, is smaller than an extension between the edges of neighbouring trays, also seen parallel to the dispensing direction. A limited extension of the gap, seen parallel to the dispensing direction, may be the case in closely stacked objects (see FIG. 1A and FIG. 1B).

According to one possible embodiment of the denesting element of the disclosure, the contact section is elastically displaceable between the extended position and the retracted position, when the denesting element is mounted in the denesting apparatus, by the contact section being capable of displacing elastically in relation to the base. Elastic displacement can be between the contact section itself and a base, and where the base supports the contact section in relation to a drive element of the denesting apparatus, and onto which drive element the denesting element is mounted. Only the contact section, and not the entire denesting element, being elastically displaceable between the extended position and the retracted position, when mounted in the denesting apparatus, results in a safe and secure placing of the denesting element to the denesting apparatus, while still obtaining the purposes of the disclosure, namely reliable denesting of closely stacked objects.

In the one possible embodiment of the disclosure as mentioned above, in the extended position, the contact section, when mounted in the denesting apparatus, is in a position closer to the outermost first object to be denested than a position of the base in relation to the outermost first object. In the retracted position, the contact section is in a position more towards the base than when the contact section is in the extended position. The extended position and the retracted position are viewed along a direction of elastic displacement of the contact section.

According to another embodiment of the denesting element of the disclosure, the contact section is elastically displaceable between the extended position and the retracted position, when the denesting element is mounted in the denesting apparatus, by the base being capable of displacing elastically in relation to the drive element. Alternative to the contact section displacing elastically in relation to the base, elastic displacement can be between the base, which supports the contact section, and the drive element of the denesting apparatus, and onto which drive element the denesting element is mounted.

In the other possible embodiment of the disclosure as mentioned above, the contact section is in a position in relation to the base being identical in both the extended position and the retracted position. However, in the extended position of the contact section, the base, when mounted to the drive element, is in a position closer to the outermost first object to be denested than a position of the drive element in relation to the outermost first object. In the retracted position of the contact section, the base is in a position more towards the drive element than when the contact section is in the extended position. The extended position and the retracted position are viewed along a direction of elastic displacement of the contact section.

According to an aspect of the denesting element of the disclosure, when mounted in the denesting apparatus and when operating in the denesting apparatus, the contact section is inserted into a gap between an edge of a first object and an edge of a second object in the stack of objects to be denested from the denesting apparatus, where the first object is an outermost object in relation to the predetermined denesting direction, and where the second object is an object situated between the first object and the remaining stack of objects, and where the contact section, during denesting of objects in the denesting apparatus, enters the gap and contacts the edge of the first object and is elastically displaceable between the extended position and the retracted position.

According to an aspect of the disclosure, the contact section is supported by the base via an elastic element, where the contact section is elastically displaceable between an extended position and a retracted position in relation to the base, and where the elastic element biases the contact section towards the extended position in relation to the base.

An elastic element placed between the base and the contact section results in the denesting element enabling the contact section to displace elastically. An elastic element between the base and the contact section also results in that the elastic element can be selected depending on the modulus of elasticity, which is needed or wanted of the contact section for contacting the first object during denesting of objects.

According to an even further aspect of the disclosure, the contact section is supported by the base via a pivot joint, where the pivot joint allows the contact section to perform a pivoting displacement between the extended position and the retracted position in relation to the base. A pivot joint results in the contact section being supported by the base along an axis of the pivot joint, and in the contact section, in relation to the base, pivoting around the pivot joint and being elastically displaceable in relation to the base.

According to a possible aspect of the disclosure, the elastic element is part of the pivot joint, and vice versa, where the elastic element and the pivot joint allow the contact section to perform a pivoting elastic displacement in relation to the base, and where the elastic element biases the contact section towards the extended position in relation to the base. By having the elastic element as part of the pivot joint, the pivot joint results in the contact section being supported by the base along an axis of the pivot joint, and in the contact section, in relation to the base, pivoting around the pivot joint, and in the contact section being biased towards the extended position in relation to the base.

According to an even alternative aspect of the disclosure, the denesting element has an elastic element at a position, at which the denesting element is intended for being mounted at a drive element of the denesting apparatus, and where one part of the denesting element, when mounted in the denesting apparatus, and onto which one part the denesting element is mounted, is displaceable between an extended position and a retracted position, and where the elastic element, when the denesting element is mounted to the drive element of the denesting apparatus, biases the one part of the denesting element towards the extended position. The denesting element being elastically mounted to a drive element of the denesting apparatus results in that the entire denesting element, and not just the contact section or the base of the denesting element, is elastically displaceable between the extended position and the retracted position, when mounted in the denesting apparatus. Elastic displacement of the entire denesting element is provided by the denesting element being mounted to the drive element of the denesting apparatus via a bushing such as an elastic bushing, possible a rubber bushing, a spring bushing or a magnetic bushing.

In the even alternative aspect of the disclosure as mentioned above, the contact section is in a position in relation to the base being identical in both the extended position and the retracted position. Also the base is in a position in relation to the drive element being identical in both the extended position and the retracted position. However, in the extended position of the contact section, one part of drive element, where the base is mounted to the drive element, is in a position closer to the outermost first object to be denested than a position of another part of the drive element, where the drive element is mounted to a frame of the denesting apparatus. In the retracted position of the contact section, the one part of the drive element is in a position more towards the drive element than when the contact section is in the extended position. The extended position and the retracted position are viewed along a direction of elastic displacement of the contact section.

According to an even alternative aspect of the disclosure, the denesting apparatus has an elastic element at a position, at which the drive element is mounted to a frame of the denesting apparatus, where the drive element, when mounted in the frame of the denesting apparatus, is displaceable between an extended position and a retracted position, and where the elastic element biases the drive element towards the extended position. The drive element itself, such as drive axles of the denesting apparatus for driving the denesting element, may be elastically displaceable. The drive element may be mounted to a frame of the denesting apparatus in bushings such as rubber bushings, or along mechanical springs, which enables the drive axles to displace elastically between the extended position and the retracted position. Elastic displacement of the drive element may also be provided by the drive element itself being made of a material, such as a plastic material, being elastically displaceable to such a degree, that the contact section, when the denesting element is mounted to the drive element, is elastically displacable.

In such alternative aspect of the disclosure, the contact section is not displacing in relation to a base of the denesting element. Neither is the denesting element displacing in relation to the drive element. In such alternative aspect of the disclosure, both the drive element together with the denesting element being mounted to the drive element, and the denesting element together with the contact section being part of the denesting element, are all displacing elastically during denesting of objects from the denesting apparatus.

The elastic element for all the above-mentioned aspects of the disclosure is selected from the following elements: helical spring, leaf spring, spiral spring, elastomeric element, pneumatic spring, hydraulic spring, opposed-pole magnets.

According to an even alternative aspect of the disclosure, the contact section comprises or consists of an elastic part, and where elastic displacement of the contact section between the extended position and the retracted position, when mounted in the denesting apparatus, is an elastic displacement of the elastic part comprised by, or constituted by, the contact section. If the contact section itself comprises or constitutes an elastic part, such as rubber or plastic or spring steel, there is no need for an individual and separate elastic element for the contact section being capable of elastic displacement between the extended position and the retracted position. Placing of the contact section to the base, and placing of the denesting element to a drive element of the denesting apparatus, may be non-elastic. An elastic element is neither needed between the contact section and the base, nor needed between the base and the drive element of the denesting apparatus.

According to another aspect of the disclosure, the disclosure is a denesting apparatus for denesting of stacked objects in a predetermined denesting direction, and where the denesting apparatus has a drive element for operating the denesting element during denesting of objects, where the drive element, during denesting of objects in the denesting apparatus, is performing at least a partial rotational movement around an axis along, preferably parallel to, the predetermined denesting direction, and where the contact section of the denesting element, during the at least partial rotational movement of the denesting element, is performing a translational movement between an extended position and a retracted position, and where the contact section during a preliminary period of the translational movement, is in an extended position and extends into a gap between an edge of a first object and an edge of a second object, and where the contact section, during a later period of the translational movement, contacts an edge of the first object and, during a still later period of the translational movement, displaces elastically from the extended position to a retracted position The denesting apparatus having a drive element capable of performing a translational movement results in the denesting element itself not needing to displace elastically in relation to the drive element to which the denesting element is mounted. Displacement of the denesting element between the extended position and the retracted position takes place by the drive element displacing.

According to a possible embodiment of the denesting apparatus according to the disclosure, the denesting apparatus has an elastic element at a position, at which the drive element is mounted to a frame of the denesting apparatus, where the drive element, during denesting of objects in the denesting apparatus, is displaceable between an extended position and a retracted position, and where the elastic element biases the drive element towards the extended position. The drive element and the frame of the denesting apparatus being mutually connected via an elastic element, results in an efficient way for the drive element, and thereby the denesting element, to displace elastically between the extended position and the retracted position, when the denesting element is mounted in the denesting apparatus by means of being mounted to the drive element.

According to still another aspect of the disclosure, the disclosure is a method for denesting objects with a denesting element according to the disclosure, where the contact section, during denesting of objects in the denesting apparatus, is in contact with the edge of the first object, and where the contact section, in relation to an extended position, displaces elastically, to a retracted position, at least 0.1 mm, possibly at least 0.5 mm, possibly at least 1 mm possibly between 1 mm and 20 mm.

The elastic displacement of the contact section depends on the shape of the objects to be denested. If the objects, as example, are trays for holding foodstuff, such trays often have an edge with a certain shape and certain dimension along directions parallel to and perpendicular to the preferred denesting direction. The edge is for providing the tray with rigidity and for possibly attaching a foil or a lid to the tray.

The contact section being elastically displaceable a certain, but limited, distance, results in the contact section being rigid enough to enter the gap between the edges of the objects, but at the same time being elastic enough to adjust to tolerances within the gap.

BRIEF DESCRIPTION OF THE DRAWINGS

The disclosure is hereafter described with reference to the drawings, where.

DETAILED DESCRIPTION

Figure 1A:
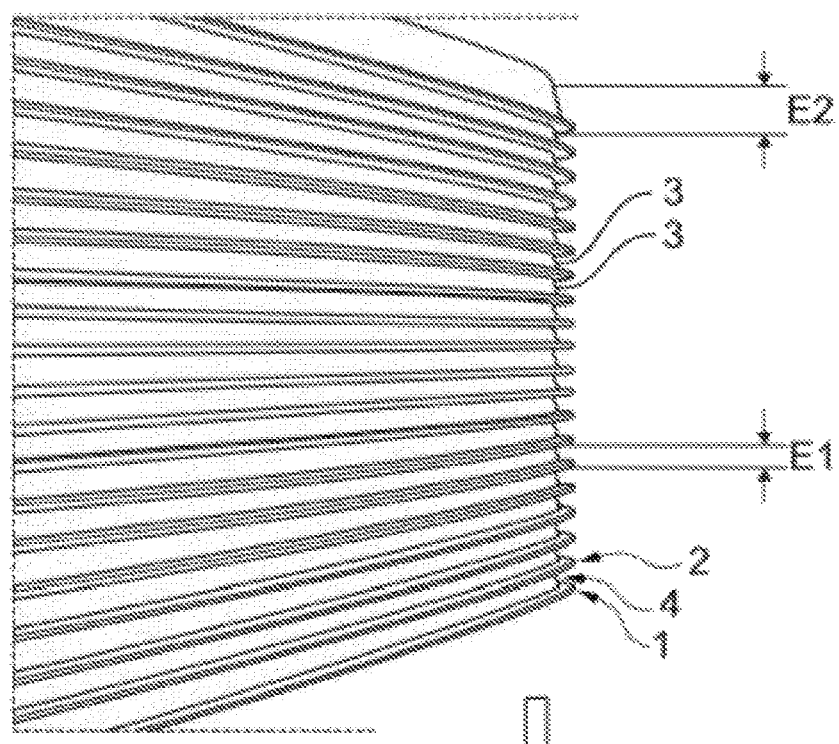
FIGS. 1A-1B illustrate part of a stack of objects to be denested, and which in the figures 30 shows rounded corners of a stack of black trays, intended for containing, e.g., foodstuff.
Figure 1B:
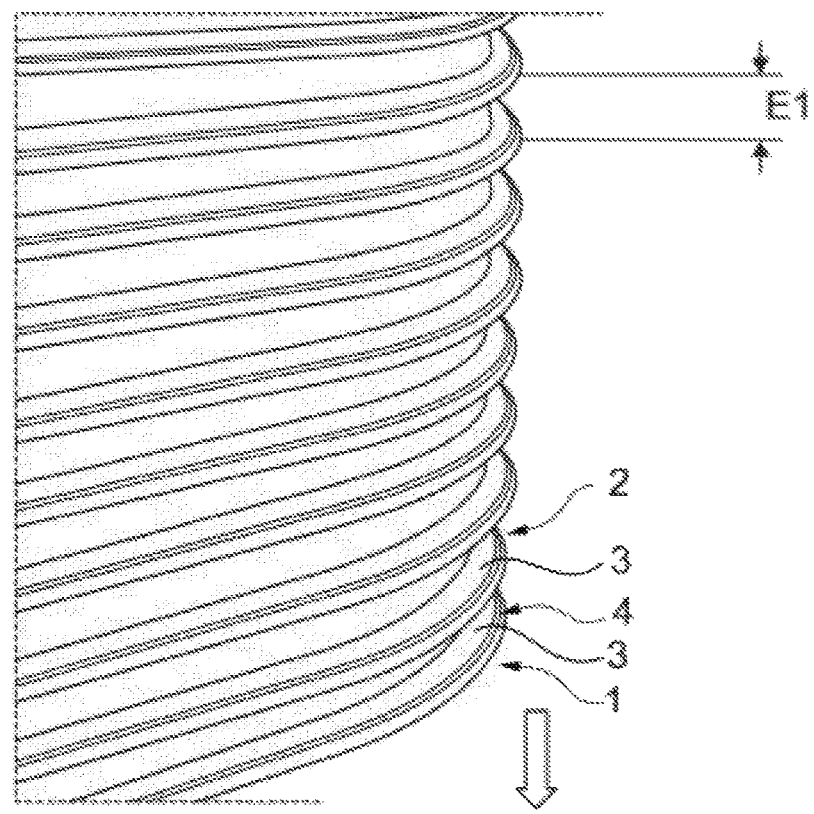

FIGS. 1A-1B illustrate a corner part of a stack of objects, the objects shown being a plurality of black trays. The trays are intended for being denested in a denesting direction, which in the figure is a downwards denesting direction, designated by the downwards pointed arrow. A first tray 1 is an outermost tray of the stack, and a second tray 2 is a subsequent tray, neighbouring the outermost first tray 1 in relation to the denesting direction. Because of the geometrical shape of the trays, in the trays are closely stacked.

Other objects than trays are possible denesting. The objects may be made of various materials such as plastic, metal, paper and with a square, a round, a triangular, an elliptical or any other shape when seen from above (see FIG. 4). Examples of such objects are food and beverage containers, food containers with lids hinged to the food container, food and beverage cups, lids for any such food and beverage containers and cups. The objects may also be containers and cups not intended for food or beverages, and which are closely stacked during manufacturing and/or transport and/or storing, and which objects must be denested individually before being used for a specific purpose.

FIGS. 1A-1B also illustrate that a gap 4 is formed by edges 3 of the trays 1, 2. An extension E4 of the gap 4 between the edges 3 forming the gaps 4, seen along the dispensing direction of the stack, is very limited. The extension E1 of the gap 4 between the edges 3, forming the gap 4, may be as small as 1.0 mm or even less. FIGS. 1A-1B also illustrate that the extension E1 of the gap 4 between the edges forming the gaps 4, is not the same between the different trays. Gaps 4 are relatively larger between some trays and relatively smaller between other trays. Such uneven stacking of the trays, resulting in different extension E1 of different gaps 4 between the edges 3 is common in closely stacked trays.

The edges 3 of the trays have an extension E2, seen in the dispensing direction. The edges 3 extend from an upper periphery of the edges, shown at the upper delimiting line of the extension E2, to a lower periphery of the edges, shown at the lower delimiting line of the extension E2. Along the extension E2 of the edges 3, the edges 3 slope outwards, which in the figures is towards right, from the upper periphery to the lower periphery.

The extension E1 of the gap 4 between the edges 3 forming the gaps 4 is smaller than the extension E2 between an upper periphery at a top (see FIGS. 6G-J) and a lower periphery of the edges 3 of the trays. The extension E2 being smaller than the extension E1 results in the upper periphery at the top (see FIGS. 6G-J) of the edges 3 of each tray not being immediately accessible via the gap 4 between the edges 3. Such stacking may be one characteristic of what herein is designated as closely stacked trays.

Figure 2:
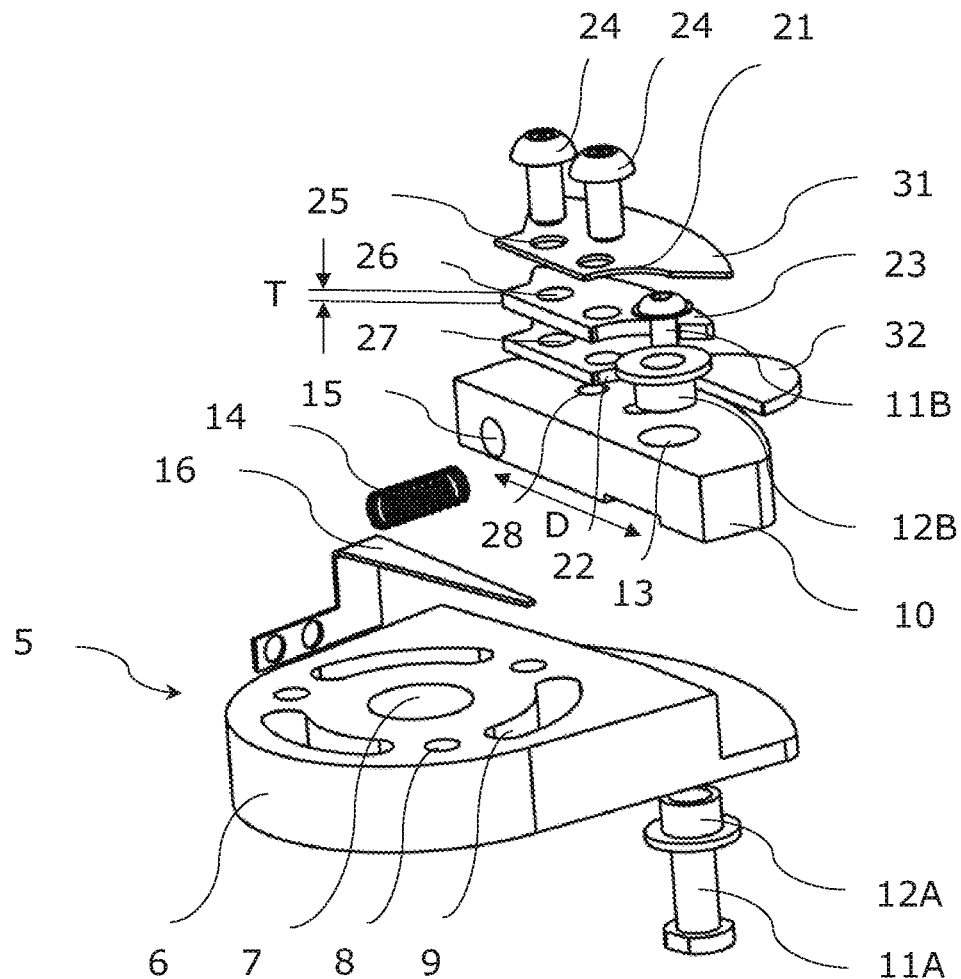
FIG. 2 illustrates an exploded view of a denesting element according to the disclosure.
Figure 3:
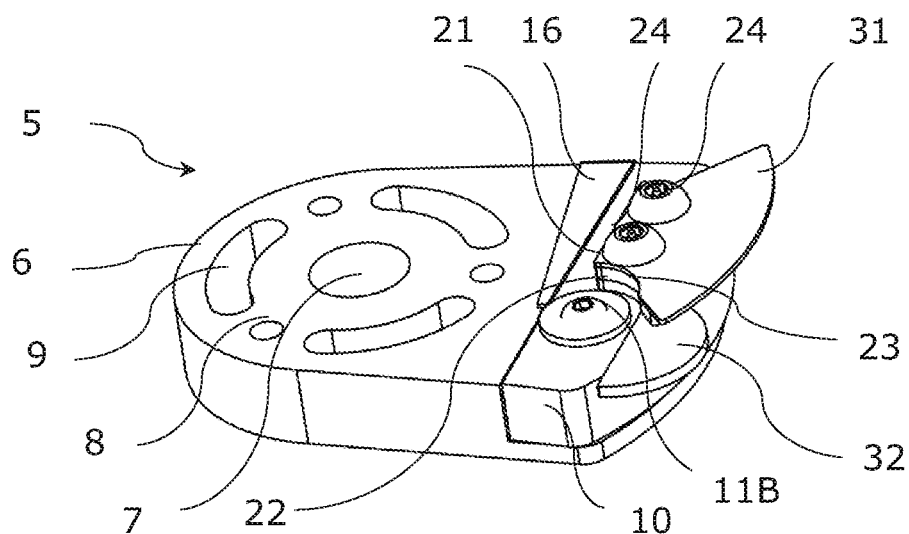
FIG. 3 illustrates an assembled view the denesting element according to the disclosure.

FIG. 2 and FIG. 3 illustrate, in an exploded view and in an assembled view, respectively, a preferred embodiment of a denesting element 5. The denesting element 5 comprises a base 6 with a centre hole 7. The base 6 is intended for being mounted on a corresponding drive element of a denesting apparatus (see FIG. 4). The base 6 has additional holes 8, 9 for mounting the denesting element to the drive element or for mounting additional elements (not shown) to the denesting element.

The denesting element 5 also has a lever 10. The lever 10 is supported by the base 6 via a pivot joint 11A. In the embodiment shown, the pivot joint 11A is a bolt. The bolt 11A has an inner thread, and another bolt 11B has an outer thread. The other bolt 11B is for fastening bushings parts 12A, 12B to the one bolt 11A. The outer thread of the other bolt 11B engages with the inner thread of the one bolt 11A.

A bushing is present between the pivot joint 11A and the lever 10. In the embodiment shown, the bushing is constituted by one bushing 12A at the underside of the lever 10, and another bushing 12B at the top side of the lever 10. Both bushing parts 12A, 12B of the bushing extend through a corresponding hole 13 in the lever 10. The one bolt 11A extends through both bushing parts 12A, 12B of the bushing.

The lever 10 is biased by an elastic element 14. In the embodiment shown, the elastic element 14 is a spring. The spring 14 is nested in a hole 15 in the lever 10 and in an opposite hole (not shown) in the base 6. The spring 14 is placed at a distance D, along an extension of the lever 10, from the pivot joint 11A. In the position of the lever 10 shown in FIG. 3, the spring 14 biases the lever 10 to an extended position in relation to the base 6, pivoted around the pivot joint 11A (see FIG. 3.). A guard plate 16 covers the spring 14 (see FIG. 3).

A spacing (not shown) is present between the base 6 and the lever 10, at the position where the spring 14 is placed. The spacing has a shape and a size identical to the shape and size of the top of the guard plate 16 covering the spring 14. The guard plate 16 is also covering the spacing, in which the spring 14 extends.

As mentioned, in the embodiment shown, the elastic element 14 is a spring placed between the base 6 and the lever 10. The lever 10 is capable of pivoting around the pivot joint 11A between the extended position shown in FIG. 3, and a retracted position in relation to the base 6. In the retracted position of the lever 10, the spacing between the base 6 and the lever 10 is smaller than in the position shown in FIG. 3, where the lever 10 is in the extended position. When the lever 10 is in the retracted position, the elastic element 14 is compressed, or the elastic element 14 is at least more compressed, than shown in FIG. 3. The guard plate 16 may be separate element, as shown, or may be an element integrate with the lever 10 or with other parts of the denesting element 5.

The guard plate 16 is fastened to the base 6 by bolts (not shown) or other means for fastening. The fastening means may be means capable of releasing the guard plate 16 from the base 6, or the fastening means may be means permanently fastening the guard plate 16 to the base 6. The guard plate 16 is shaped so that the guard plate 16 does not restrict the lever 10 from pivoting in relation to the base 6. The guard plate 16 ensures, that if the spring 14, unintentionally, is released from the nesting in the holes of the base 6 and the lever 10, all or part of the spring 14 is not be able to leave the spacing covered by the guard plate 16. If the spring 14 was not covered by the guard plate 16 and could leave the spacing, the spring 14 may end up in foodstuff in the trays.

The lever 10 has a first element 21 and a second element 22, both of said elements 21, 22 intended for interaction with the objects during denesting of the objects. An intermediate element 23 is placed between the first element 21 and the second element 22. The intermediate element 23 provides a small distance between the first element 21 and the second element 22. The distance between the first element 21 and the second element 22 is determined by a thickness T of the intermediate element 23. Both the first element 21, the second element 22 and the intermediate element 23 is fastened to the lever 10.

The distance T, which the intermediate element 23 provides, may be changed by placing, between the first element 21 and the second element 22, an intermediate element 23 with another thickness T. Placing another intermediate element 23 to provide another distance between the first element 21 and the second element 22 may depend on the extension E1 of the gap 4 formed by edges of the objects of the stack (see FIG. 1A and FIG. 1B). Objects being more closely stacked may require an intermediate element 23 with a relatively smaller thickness. However, the main purpose of the intermediate element 23 is to provide just some distance between the first element 21 and the second element 22.

In the embodiment shown, the elements 21, 22, 23 is fastened to the lever 10 by means of two bolts 24 extending through holes 25, 26, 27 in the elements 21, 22, 23 and into corresponding threads 28 in the lever 10. Other fastening means may be used, obvious to the skilled person for obtaining adequate, and possible releasable, fastening of the elements 21, 22, 23 to the lever 10. By using bolts for fastening the elements 21, 22, 23 to the lever 10, the elements 21, 22, 23 may be released and exchanged.

Alternatively, if fastening of one or more of the elements 21, 22, 23 does not have to be releasable, fastening means such as bracing, soldering or gluing may be used to fasten one or more of the elements 21, 22, 23 to the lever 10. Also in the alternative, one or more of the elements 21, 22, 23 may constitute integrate parts of the lever 10 itself.

The first element 21 has a contact section 31. The contact section 31 is intended for entering the gap 4 (see FIGS. 1A-1B) formed by edges 3 of the objects 1, 2. The contact section 31 may have a thickness depending on the extension E1 of the gaps 4 formed between the edges 3 of the objects. In the embodiment shown, the contact section 31 has an arched periphery. The arched periphery of the contact section 31 is pointed at each end of the arched periphery. Interaction between the contact section 31 and the outermost first tray 1, during denesting of objects, is shown in FIGS. 6A-6J.

In the embodiment shown, the first element 21 is made of stainless steel. The contact section 31 has a thickness along the arched periphery of 0.5 mm. The thickness may vary depending on the extension E1 of the gap 4 formed between the edges 3 of the objects, especially if the size of the gap is small, as shown and described with reference to FIGS. 1A-1B. The thickness of the contact section 31 along the arched periphery may thus be larger for objects stacked with an extension E1 of the gap 4 formed between the edges 3 being larger than shown and described with reference to FIGS. 1A-1B.

The second element 22 has a support section 32. The support section 32 is intended for supporting an outermost first object 1 (see FIGS. 6A-6J). Part of the support section 32 is overlapping the contact section 31 of the first element 21 by a certain extension, depending on the geometrical configuration of edges of the trays to be denested. In the embodiment shown, the support section 32 has an arched periphery. At least a part of the support section 32, not overlapping the contact section 31, is pointed at the end of the support section 32. Interaction between the support section 32 and the objects, during denesting of objects, is shown in FIGS. 6A-6J.

Figure 4:
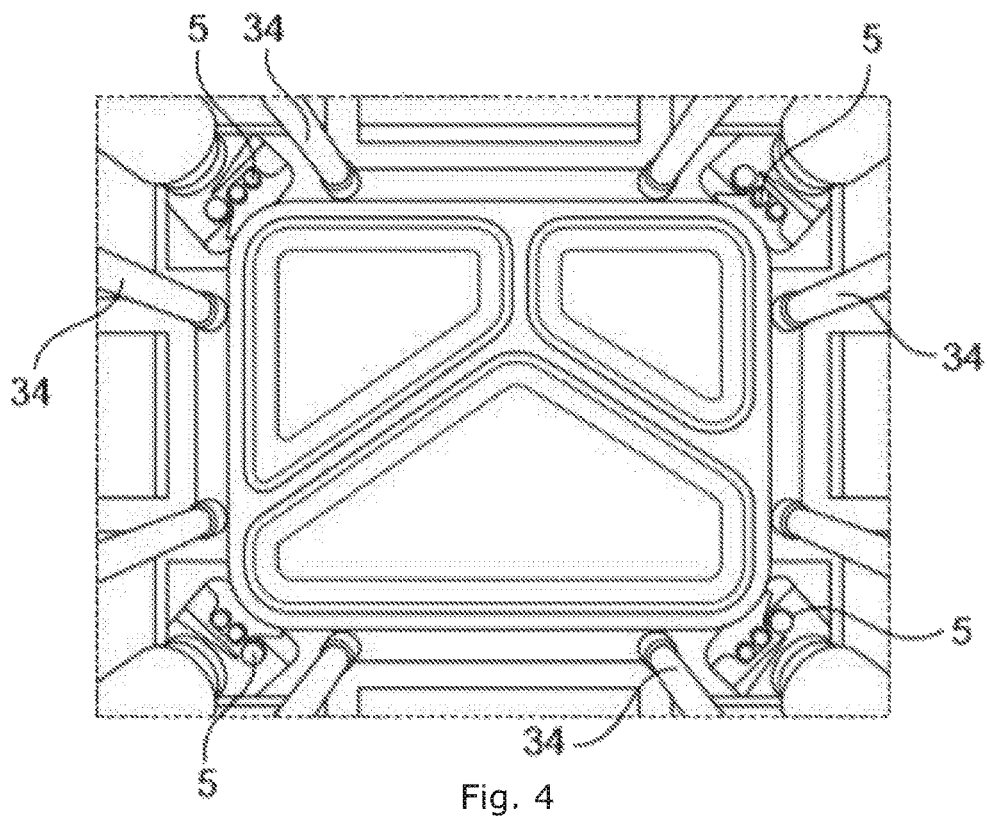
FIG. 4 illustrates an apparatus according to the disclosure, seen from above, with a stack of 35 trays, with a denesting element of the disclosure at four corners parts of the stack of trays.

FIG. 4 illustrates a denesting apparatus for denesting a stack of trays. In the figure, the trays are white and have a generally rectangular cross-section as seen from above, and have rounded corners. A denesting element 5 as shown and described with reference to FIG. 2 and FIG. 3 is placed at each rounded corner of the edges of the stack of trays.

Depending on the shape of the objects such as trays, and depending on the size of the objects such as trays, one or more denesting elements may be placed along sidewalls, and not at the corners, of the objects. Also, denesting elements may be placed at only some corners, and not at each corner. Furthermore, denesting elements may be placed both at one or more corners and at one or more sidewalls at the same time. Accordingly, the number of denesting elements and placing of denesting elements along edges of the objects may vary depending on the shape and the size of the objects and on the material such as plastic foil, metal foil, cardboard, paper, which the objects are made of.

Each of the denesting elements 5 is mounted on drive elements 33. In the shown embodiment, the drive elements 33 are rotary drive axles, to which the denesting elements are mounted. The drive axles 33 are intended for performing at least a partly rotational movement around an axis perpendicular to the plane of the figure. Rotational movement of the drive axles 33 results in a corresponding rotational movement of the denesting elements 5.

In an alternative embodiment, the drive elements may be drive gliders, to which the denesting elements are mounted. The drive gliders are intended for driving the denesting element by performing a translational movement towards and away from the stack of objects, in the plane of the figure. Translational movement of the drive gliders results in a corresponding translational movement of the denesting elements 5.

The need for four, or more or less, denesting elements 5 along edges of the objects, depends on the type of objects, the size of the object, the geometrical shape of the objects and the material, which the objects are made of. If the objects are relatively smaller than the trays shown, fewer denesting elements may be needed. If the geometrical shape of the objects is more rounded than the trays shown, or if geometrical shape of the objects possibly is more polygonal than rectangular as the trays shown, only one denesting element, or at least less than four denesting elements, may be needed.

Guide rails 34 are placed along edges of the stack of trays. In the embodiment shown, the guide rails 34 are steel rods extending perpendicular to the plane of the figure. Two guide rails 34 are placed along edges. In other embodiments, only one guide rail, or more than two guide rails, may be placed along edges of the objects. In still other embodiments of the denesting apparatus, there are no guide rails, and the stack of objects is only supported by the denesting elements.

The need for guide rails, and the need for one or more guide rails along one or more edges of the objects, depends on the type of objects, the size of the object, the geometrical shape of the objects and the material, which the objects are made of. If the objects are relatively smaller than the trays shown, fewer guide rails may be needed. If the geometrical shape of the objects is more rounded than the trays shown, or possibly is more polygonal than rectangular as the trays shown, no guide rails may be needed.

As a supplement (not shown) of the denesting apparatus, various elements may be provided for relieving a weight of the stack of objects onto the contact section 31 and the support section 32. Weight relieving elements may be claw-like elements lifting the stack of objects at a position along the stack, compared to the outermost first object and the subsequent second object. Weight relieving element may also be elements similar to a denesting element, having a support section lifting the stack of objects at a position up the stack compared to the outermost first object and the subsequent second object.

Figure 5:
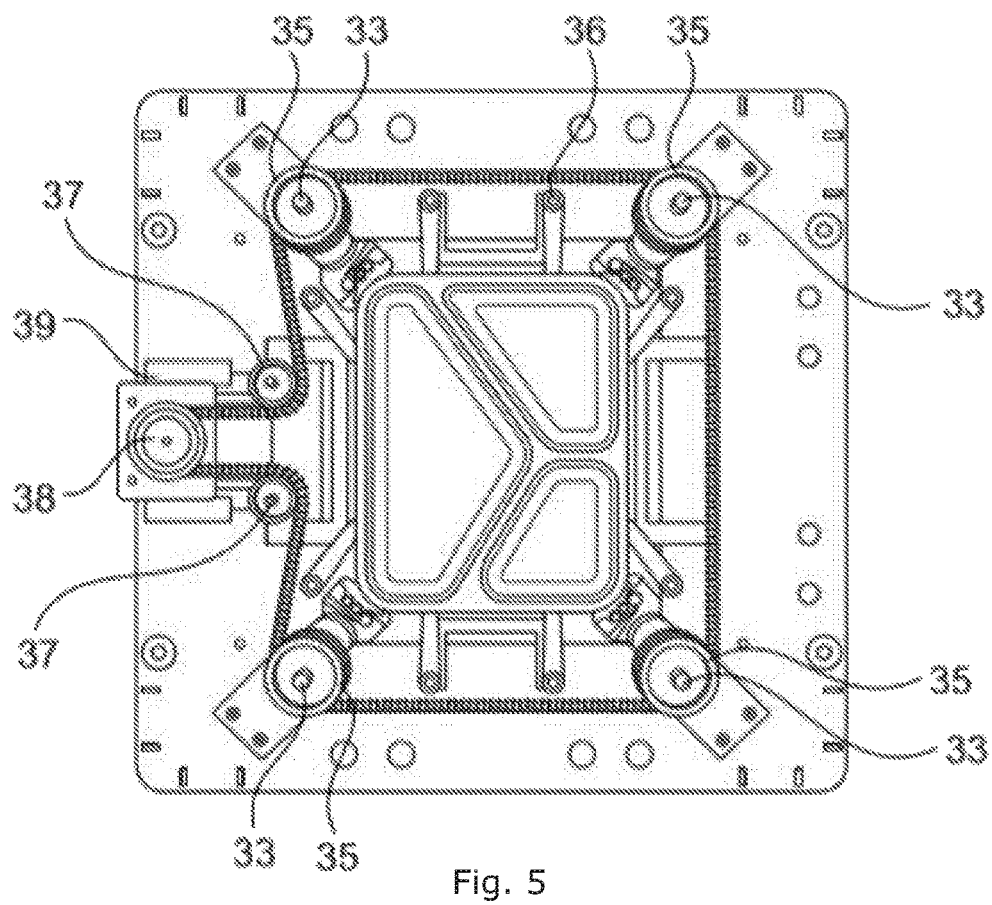
FIG. 5 illustrates the apparatus of the disclosure, seen from above, with the stack of trays, to show a drivetrain of the apparatus.

FIG. 5 illustrates the denesting apparatus for denesting a stack of trays, seen from above, with the stack of trays. The figure shows drive wheels 35 mounted to each drive axle 33 for driving the denesting elements 5, see FIG. 4. The drive wheels 35 are all driven by a drive belt 36 extending along each drive wheel 35, extending along free rollers 37 and extending along a driving wheel 38 of an actuator 39. A chain or a wire may be used instead of a belt.

In the embodiment shown, the actuator 39 is an electrical motor, preferably a stepping motor, capable of driving the driving wheel 38 of the actuator 39 and the drive wheels 35 of the denesting elements 5 in steps, clockwise and counterclockwise. In other embodiments of the denesting apparatus, other actuators than stepping motors may be used such as hydraulic actuators or pneumatic actuators, servo-motors or DC motors.

In still other embodiments of the denesting apparatus, each of the drive wheels 35 of the denesting elements may have an actuator, and where each of the actuators of the drive wheels 35 are synchronized. Especially in an embodiment, where only one denesting element is needed, the actuator drives the drive wheel 35 of the denesting element 5 directly, and not along a belt.

FIGS. 6A-6J illustrate and describe a sequence of operational positions of the denesting elements 5, of the contact section 31 and of support section 32 during denesting of objects from a stack of objects nested in a denesting apparatus as shown in FIG. 4 and FIG. 5.

Figure 6A:
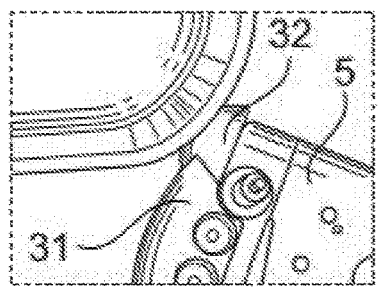
FIGS. 6A-6J illustrates a corner part of the stack of trays and a denesting element, and shows operational steps of the denesting element during denesting of trays from the 5 stack.
Figure 6B:
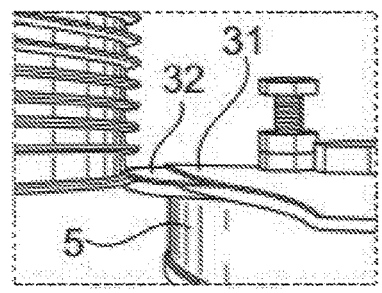

In FIG. 6A and FIG. 6B, a stack of objects are trays ready for denesting. In the following, trays are used as a non-limiting example of objects to be denested. The denesting element 5 is in rotational position around the drive axle 33, where the support section 32 is supporting a corner edge of an outermost first tray 1 in the stack of trays (see also FIGS. 1A and 1B). The other denesting elements (not shown) and placed at the other corners of the stack of trays (see FIG. 4 and FIG. 5) are in a similar position as the position of the denesting element shown in FIG. 6A and FIG. 6B. In the shown position of the denesting element 5, denesting of trays cannot be performed, because the trays are supported by the support section 32 of the second element 22 (see also FIG. 3 and FIG. 4).

Figure 6C:
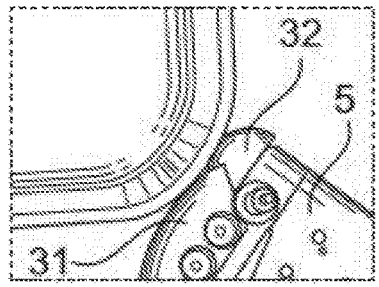
Figure 6D:
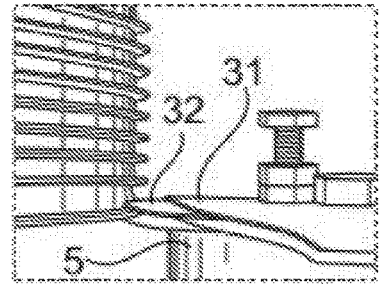

In FIG. 6C and FIG. 6D, the stack of trays is still supported by the support section 32. The denesting element 5 is rotated clockwise compared to the position shown in FIG. 6A and FIG. 6B. The denesting element 5 is in rotational position around the drive axle 33, where the contact section 31 has entered a gap 4 between the outermost first tray 1 (see FIG. 1A and FIG. 1B) and the subsequent second tray 2 (see FIG. 1A and FIG. 1B), said second tray 2 neighbouring the outermost first tray 1 in the stack of trays. In the shown position of the denesting element 5, a outermost first tray 1 is still supported by the support section 32, but the contact section 31 is, at the same time, about to contact the edge 3 of the outermost first tray 1 and also supports a subsequent second tray 2.

Figure 6E:
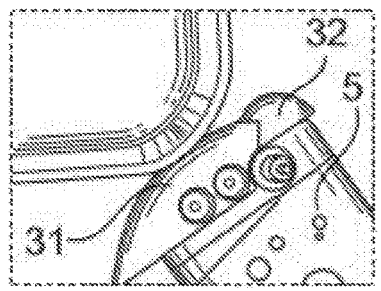
Figure 6F:
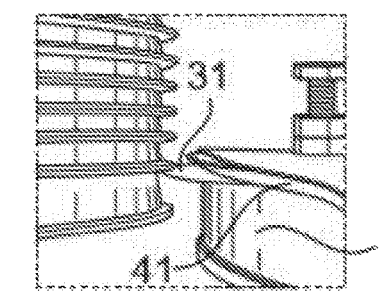
Figure 6G:
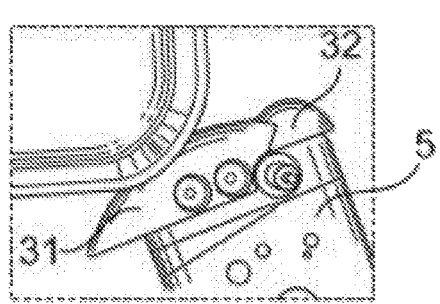
Figure 6H:
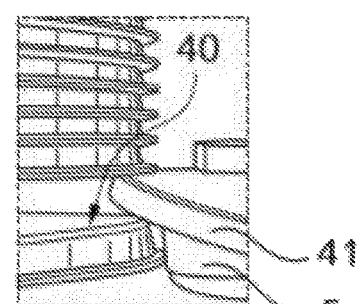
Figure 6I:
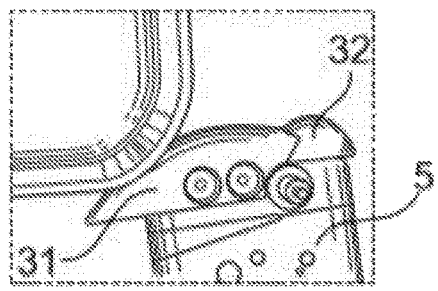
Figure 6J:
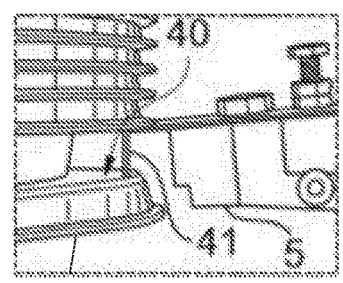

In FIG. 6E and FIG. 6F, the stack of trays is no longer supported by the support section 32.

The denesting element 5 is rotated further clockwise compared to the position shown in FIG. 6C and FIG. 6D. However, the stack of trays, apart from the outermost first tray 1, is supported by the contact section 31.

Denesting of the outermost first tray 1 starts by the contact section 31 entering more and more into the gap 4 formed by the edge 3 of the outermost first tray 1 and the edge 3 of the subsequent second tray 2, and by the contact section 31 contacting the edge 3 of the outermost first tray 1. Because the contact section 31 is capable of displacing elastically, and because the contact section 31 is capable of being biased towards and away from the stack of trays by means of the elastic element (see FIG. 2 and FIG. 3), the contact section 31 is constantly elastically forced towards the stack of trays and constantly elastically forced into contact with the edge 3 of the outermost first tray 1. But because of the capability of elastic displacement, the contact section 31 is not be forced so much, that the edge 3 of the outermost first tray 1 is damaged by the contact section 31.

Because the support section 32 is no longer supporting the stack of trays, the outermost first tray 1 is denested from the stack of trays, in a denesting direction being into the plane of FIG. 6E and downwards in FIG. 6F. Denesting direction is preferably in the direction of gravity, so that the gravity assists in denesting of the outermost first tray 1 from the stack of trays.

Other denesting directions such as sideways or upwards is possible. Other denesting directions may be dependent on other forces than gravity, such as a vacuum force or a gripping means, for denesting the outermost first tray 1 from the stack of trays.

Denesting of the outermost first tray 1 from the stack of trays is obtained both because the support section 32 is no longer supporting the stack of trays, and because the contact section 31 has separated the outermost first tray 1 from the subsequent second tray 2.

Because of the edge 3 of the trays sloping outwards along the extension E2 of the edges 3, as shown in FIGS. 1A-1B, the contact section 31 forces the outermost first tray 1 in the dispensing direction. Gravity will not always, and will rarely, be sufficient for denesting the outermost first tray 1 from the stack of trays. Gravity not being capable denesting the outermost first tray 1 from the stack of trays is because of electrostatic forces and/or vacuum forces between the trays of the stack of trays holding the trays together.

When the outermost first tray 1 is denested, rotation of the denesting element 5 stops, and the denesting element 5 rotates oppositely, that is, rotates counterclockwise. After a certain angular rotation counter-clockwise, support by the contact section 31 ends.

But, before support by the contact section 31 ends, the support section 32 is displaced so that the stack of trays, when support by the contact section 31 ends, drops onto the support section 32. Further rotation counter-clockwise of the denesting element 5 results in a position of the denesting element 5 as shown in FIG. 6A and FIG. 6B. Thereafter, a new denesting operation as shown in FIGS. 6A-6J can be performed. In the embodiment of the denesting element 5 shown in FIGS. 6A-6J, the contact section 31 is provided with a protrusion 41. FIG. 6G, FIG. 6H, FIG. 6I and FIG. 6J show the protrusion 41 assisting in denesting the outermost first tray 1 during rotation clockwise of the denesting element 5.

After the contact section 31 has entered the gap 4 between the edges 3 of outermost first tray 1 and the subsequent second tray 2, and after the contact section 31 has entered into contact with the edge 3 of the outermost first tray 1, denesting of the outermost first tray 1 starts. The edges of the trays are inclined in relation to the denesting direction and denesting of the outermost first tray 1 starts, when the contact section 31 is forced towards the edge 3 of the outermost first tray 1.

However, if high vacuum forces are present between the outermost first tray 1 and the subsequent second tray 2, risk occurs of the outermost first tray 1 not being completely denested by the contact section 31. The protrusion 41 provides a force in the denesting direction onto a top 40 of the edge 3 of the outermost first tray 1. The force in the denesting direction, onto the top 40 of the edge 3 of the outermost first tray 1 from the protrusion 41, is denesting the outermost first tray 1 further than the contact section 31 is capable of.

If denesting of the trays is performed in another direction than downwards as shown in FIGS. 6A-6J, gravity is not assisting in denesting the trays. The protrusion 41 may then provide the necessary force for denesting the outermost first tray 1 from the stack of trays. Subsequently, the outermost first tray 1 may be further removed from the stack of trays by other means such mechanical gripping means or vacuum force means, pulling the outermost first tray 1 further away from the stack of trays and onto a conveyer belt or other means for further use of the outermost first tray 1, subsequent to denesting.

The outermost first tray is now denested from the stack of trays, and the first tray is no longer part of the stack of trays, and the first tray is now a previous first tray. The previous subsequent second tray now becomes a new outermost first tray. A previous third tray, next to the previous second tray, now becomes a new subsequent second tray.

The present disclosure is described in relation to the specified embodiment, but the disclosure should not be construed as being limited to the presented examples. The scope of the present disclosure is set out by the claims. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures is not be construed as limiting the scope of the disclosure. Furthermore, features mentioned in different claims may be combined, and mentioning of features in different claims does not exclude that a combination of features is not possible.

The invention claimed is:

1. A denesting element for a denesting apparatus for denesting a stack of objects in a predetermined denesting direction, comprising:
    a base and a contact section, wherein the base is disposed between the contact section and a drive element of the denesting apparatus, wherein the base is operable for mounting on the drive element of the denesting apparatus, and wherein the contact section is operable for entering a gap formed by edges of objects of the stack of objects,
    wherein the drive element drives the base rotationally,
    wherein, when the denesting element is mounted in the denesting apparatus, and when the base of the denesting element is mounted on the drive element, during denesting of objects in the denesting apparatus, when the drive element performs at least a partial rotational movement around an axis along the predetermined denesting direction, the contact section is inserted into a gap between an edge of a first object and an edge of a second object in the stack of objects to be denested from the denesting apparatus and the contact section contacts the edge of the first object,
    wherein the first object is an outermost object in relation to the predetermined denesting direction, wherein the second object is an object situated between the first object and a remaining stack of objects,
    wherein the contact section, during denesting of objects in the denesting apparatus, is capable of being biased towards and away from a stack of objects by being elastically displaceable in relation to the base between an extended position and a retracted position, and
    wherein the extended position of the contact section is a position more towards the stack of objects than the retracted position of the contact section, and the retracted position of the contact section is a position less towards the stack of objects than the extended position of the contact section.

2. The denesting element of claim 1, wherein the contact section is supported by the base via an elastic element, and wherein the elastic element biases the contact section towards the extended position in relation to the base.

3. The denesting element of claim 2, wherein the contact section is supported by the base via a pivot joint, where the pivot joint allows the contact section to perform a pivoting displacement in relation to the base, between the extended position and the retracted position in relation to the base.

4. The denesting element of claim 3, wherein the elastic element is part of the pivot joint, and wherein the elastic element and the pivot joint allow the contact section to perform a pivoting elastic displacement in relation to the base.

5. The denesting element of claim 2, wherein the elastic element is a helical spring, a leaf spring, a spiral spring, an elastomeric element, a pneumatic spring, a hydraulic spring, or opposed-pole magnets.

6. The denesting element of claim 1, wherein the contact section includes an elastic part, and wherein elastic displacement of the contact section between the extended position and the retracted position, during denesting of objects in the denesting apparatus, is an elastic displacement of the elastic part.

7. The denesting element of claim 1, wherein the denesting element comprises a first element including the contact section and a second element including a support section, wherein the support section is provided at a distance from the contact section along the predetermined denesting direction, and wherein the distance is between 0.1 mm and 10.0 mm.

8. A denesting apparatus with a denesting element for denesting a stack of objects in a predetermined denesting direction, comprising:
   a drive element for operating the denesting element during denesting of objects, wherein the drive element, during denesting of objects in the denesting apparatus, performs at least a partial rotational movement around an axis along the predetermined denesting direction; and
   a contact section of the denesting element, wherein the contact section, during the at least partial rotational movement of the denesting element, performs a translational movement, in relation to a base of the denesting element, between an extended position and a retracted position,
   wherein the contact section during a preliminary period of the translational movement, in relation to the base of the denesting element, is in an extended position and extends into a gap between an edge of a first object and an edge of a second object, and
   wherein the contact section, during a later period of the translational movement, in relation to the base of the denesting element, contacts an edge of the first object and, during the later period of the translational movement, displaces elastically from an extended position to a retracted position because of the contact section contacting the edge of the first object.

9. A method for denesting objects with a denesting apparatus including a denesting element, comprising:
   contacting, by a contact section, an edge of a first object, wherein the contact section is inserted into a gap between an edge of a first object and an edge of a second object in a stack of objects to be denested from the denesting apparatus, and wherein the first object is an outermost object in relation to a predetermined denesting direction, and where the second object is an object situated between the first object and a remaining stack of objects;
   displacing elastically, in relation to a base, the contact section, and in relation to an extended position, to a retracted position; and
   denesting an outermost first object from the stack of objects by the contact section separating the outermost first object from a subsequent second object of the stack of objects.

* * * * *